United States Patent [19]

Oh

[11] Patent Number: 5,311,575
[45] Date of Patent: May 10, 1994

[54] TELEPHONE SIGNAL CLASSIFICATION AND PHONE MESSAGE DELIVERY METHOD AND SYSTEM

[75] Inventor: Sang G. Oh, Garland, Tex.

[73] Assignee: Texas Instruments Incorporated, Dallas, Tex.

[21] Appl. No.: 81,481

[22] Filed: Jun. 22, 1993

Related U.S. Application Data

[63] Continuation of Ser. No. 752,708, Aug. 30, 1991, abandoned.

[51] Int. Cl.⁵ .................. H04M 1/64; H04M 3/22; G10L 5/00
[52] U.S. Cl. .................. 379/88; 379/80; 379/351; 379/377; 379/386; 381/42
[58] Field of Search ............. 379/372, 377, 381, 386, 379/351, 80, 88; 381/41, 46, 47

[56] References Cited

U.S. PATENT DOCUMENTS

| | | | |
|---|---|---|---|
| 3,873,772 | 3/1975 | Dumler | 379/80 |
| 4,032,711 | 6/1977 | Sambur | 381/42 |
| 4,689,760 | 8/1987 | Lee et al. | 379/386 |
| 4,809,321 | 2/1989 | Morganstein et al. | 379/386 |
| 5,054,083 | 10/1991 | Naik et al. | 381/42 |

*Primary Examiner*—James L. Dwyer
*Assistant Examiner*—Fan Tsang
*Attorney, Agent, or Firm*—Robert L. Troike; Richard L. Donaldson

[57] ABSTRACT

A method of processing a signal having characteristics and received from a telephone line is presented. The method includes defining a frame by measuring a plurality of samples from the signal over a predetermined period. Additionally, linear prediction coding coefficients of a selected group from the plurality of samples are determined. Further, the variance of the linear prediction coding coefficients are determined and the variances compared to a reference variance. A heuristic rule is applied to a selected characteristic of the signal to determine if the signal comprises a voice signal.

43 Claims, 2 Drawing Sheets

TELEPHONE SIGNAL CLASSIFICATION AND PHONE MESSAGE DELIVERY METHOD AND SYSTEM

This application is a continuation of application Ser. No. 07/752,708, filed Aug. 30, 1991, now abandoned.

TECHNICAL FIELD OF THE INVENTION

This invention relates in general to signal processing, and more particularly to a telephone signal classification and phone message delivery method and system.

BACKGROUND OF THE INVENTION

Communications between individuals have become an important and extensive part of contemporary society. As a result, technology has accelerated in order to produce numerous ways for individuals to communicate with one another. For example, telephone systems have become much more elaborate, facsimile machines have proliferated, computer networks are more extensive and cellular telephone systems are commonplace.

One particularly advantageous communications medium is phone message delivery. In particular, phone message delivery typically includes a system whereby a person may call the system and leave a voice message. Thereafter, the voice message is delivered to a second person who is the intended recipient of the voice message. This type of messaging system permits one person to communicate a voice message to a second person through the convenience of leaving a message without having to speak live or simultaneously with the intended recipient of the message.

One key problem or underlying complication in voice message delivery systems, however, has been an accurate and reliable delivery of the voice message to the intended recipient. In particular, certain voice message systems operate such that a voice message is stored and the intended recipient is later called in order to deliver the message to that person. Once the intended recipient answers the call, the voice message is delivered. As a result, the system must include an accurate subsystem which can detect when the intended recipient, or some answering person, has answered the phone so that the message may be delivered to that person. Thus, this system must be able to distinguish various different types of signals which it may receive in response to its efforts to contact the intended recipient of the voice message. For example, when the system tries to contact the recipient person, it may receive a ring signal, a busy signal, a clicking on the phone line or various other types of signals rather than receiving the voice response of the intended recipient. Accordingly, the subsystem must be able to distinguish these various systems from the voice of the recipient so that the message is not inadvertently delivered when it should not be.

One previous method for detecting a voice signal on the telephone line is based on Fourier analysis. Under this analysis, a telephone system places a telephone call to the intended recipient in order to deliver the voice message. The system monitors the telephone line signals received once the call is placed. In particular, the system observes eight channels of frequency components to determine whether the signals on the line represent a human voice or other possible signals which may be encountered on a telephone line. This method has been developed with the assumption that a human voice has no consistency over several 32 millisecond frames in frequency components, while non-voice signals such as a ring, busy or reorder signal do have consistency. Therefore, after taking a Fourier transform of the incoming signal, a consistency test is performed. Thereafter, based on the analysis of the consistency test, the Fourier prior art system determines whether the received signal is a human voice or some other signal.

The Fourier transform method and process, however, have been shown to perform poorly, particularly when the incoming signal has substandard quality associated with it. For example, for older telephone exchange systems, various static or clicks on the system may cause erroneous analysis under the Fourier transform system. As another example, even though there are specifications for ring signals from the Bell Telephone System, ring signals frequently violate the specifications. As a consequence, the existing Fourier method often misclassifies a ring signal as a human voice, or vice versa. In the instance where a ring signal is misinterpreted as a human voice, the system may attempt to deliver the voice message when in fact there is no human at the receiving end of the line to receive it. Naturally, this erroneous delivery prevents the actual intended recipient from ever receiving the message and, therefore, may have devastating consequences.

From the above, it may be appreciated that a need has risen for a telephone signal classification and phone message delivery system which corrects the problems or substantially reduces those associated with prior art systems.

SUMMARY OF THE INVENTION

In accordance with the present invention, a telephone signal classification and phone message delivery method and system are provided which substantially eliminate or reduce disadvantages and problems associated with prior signal classification and phone message delivery systems.

The present invention includes a method of processing a signal having characteristics and received from a telephone line. The method includes defining a frame by measuring a plurality of samples from the signal over a predetermined period. Additionally, linear prediction coding coefficients of a selected group of the plurality of samples are determined. Further, the variance of the linear prediction coding coefficients are determined and compared to a reference variance. Finally, a heuristic rule is applied to a selected characteristic of the signal to determine if the signal comprises a voice signal.

The present invention provides numerous technical advantages over systems included within the prior art. One technical advantage is a more accurate recognition of telephone line signals. Another technical advantage is the ability to provide accurate recognition between busy, reorder, click, ring and voice signals. As a result, there is the additional technical advantage that the telephone message delivery system is more accurate and reliable in delivering voice messages. Still another technical advantage is a reduced processing load on the processing capabilities of the phone message system.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE INVENTION

Figure 1:
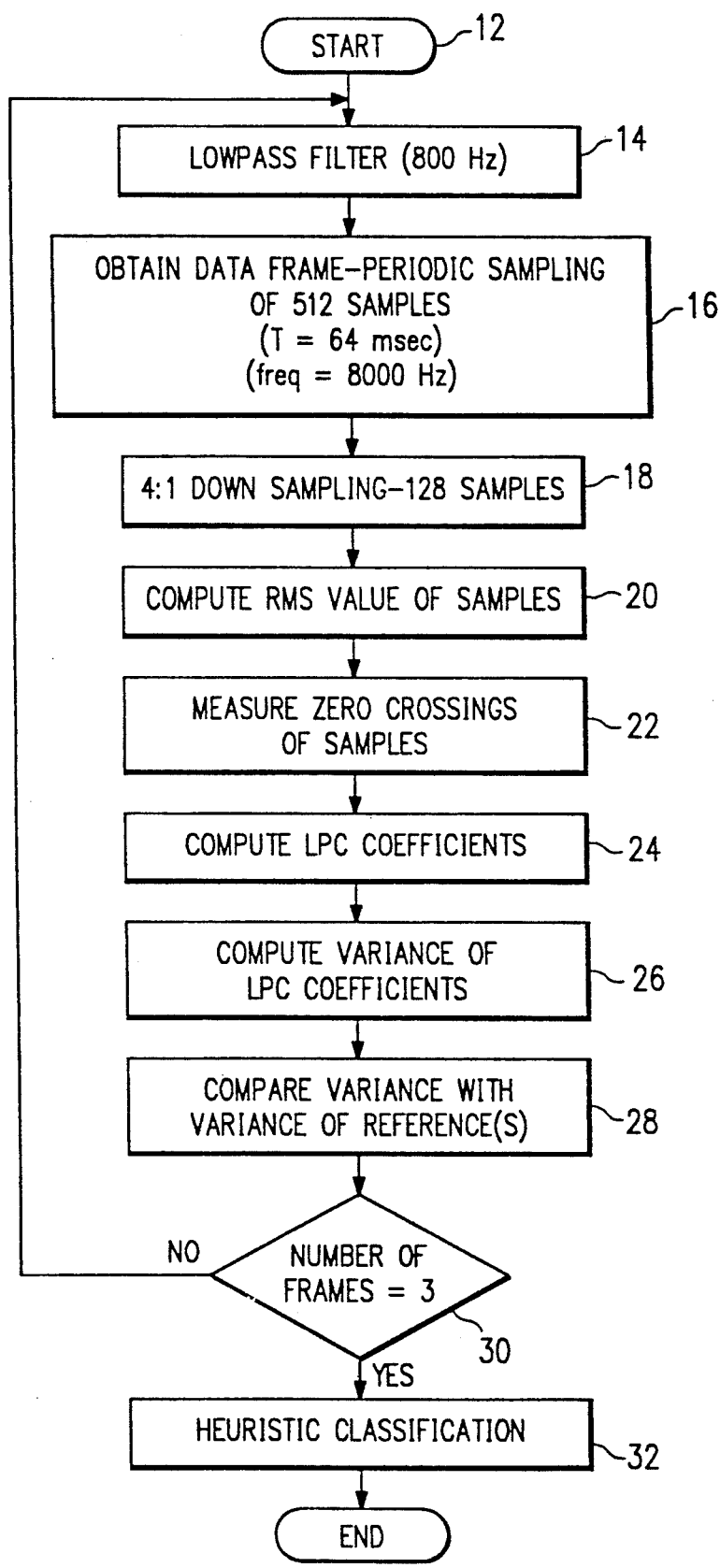
FIG. 1 illustrates a block diagram of the steps utilized for signal detection and classification in accordance with the present invention.
Figure 2:
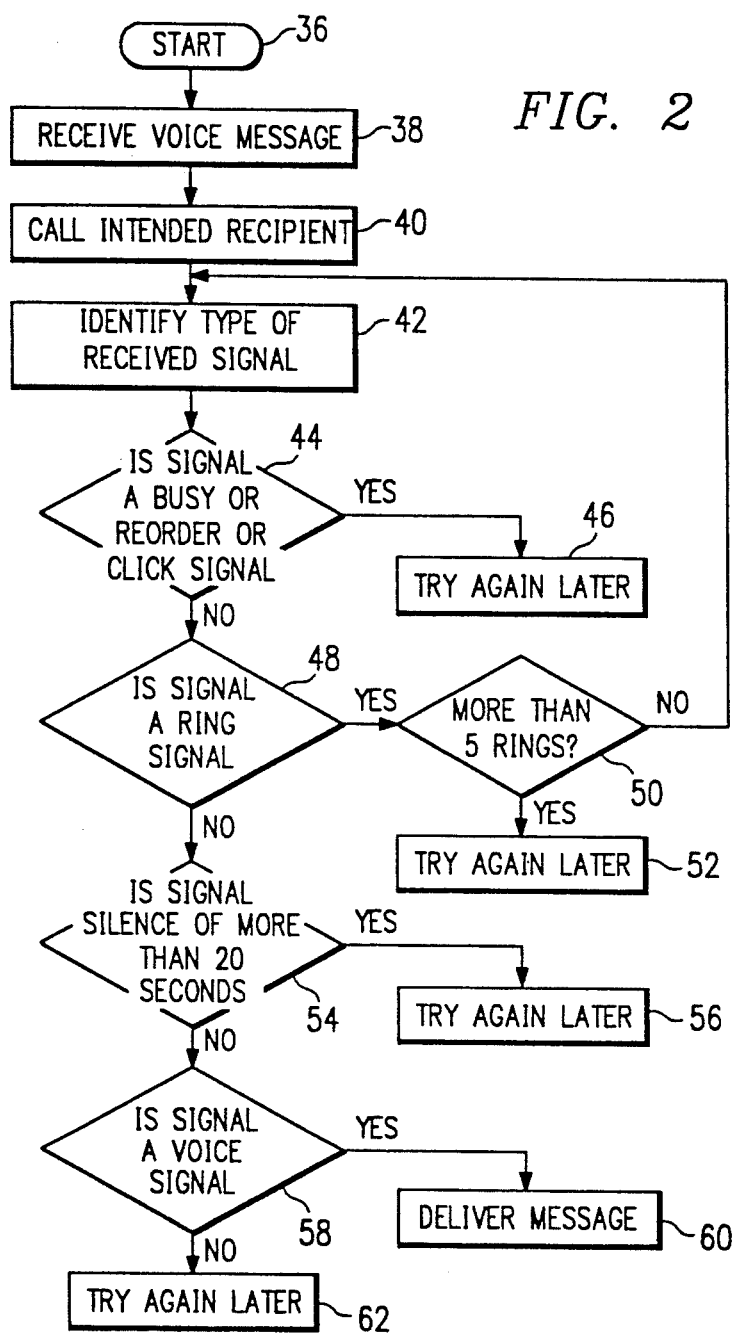
FIG. 2 illustrates the operations of a phone message delivery system in accordance with the present invention.

The preferred embodiments of the present invention are illustrated in FIGS. 1-2 of the drawings. In particular, FIG. 1 illustrates a functional block diagram of the signal processing process of the present invention, denoted generally at 10. In general, process 10 operates to analyze a signal received from a telephone line and classify whether that signal is a human voice signal or other type of signal. In the preferred embodiment, the potentially other encountered signals include a ring signal, a busy signal, a reorder signal or a click signal. Each of these various signals are those which are commonly encountered on a telephone line. The particular steps of process 10 are described in greater detail below.

Process 10 begins at a start block 12. After start block 12, the telephone line signal is passed through a low pass filter step 14. Low pass filter step 14 involves applying a bandpass filter which removes frequencies above a predetermined frequency cut-off. In the preferred embodiment, all signals above 800 Hz in frequency are removed. This preferred cut-off permits the elimination of any extraneous signals which may occur over 800 Hz, and which are therefore not processed by the remaining steps within process 10. The filtered telephone signal is broken down into data frames by sampling step 16. In the preferred embodiment, 512 data samples are gathered per frame by sampling at a frequency of 8000 Hz over a period of 64 milliseconds. Thus, each frame formed by sampling step 16 provides 512 data samples which are further analyzed by the steps in process 10.

The number of samples for each data frame is reduced in a downsampling step 18. In the preferred embodiment, downsampling is accomplished at a ratio of 4 to 1. Therefore, the 512 samples obtained in sampling step 16 are reduced to 128 samples in downsampling step 18. Downsampling is utilized in the preferred embodiment in order to reduce the amount of data which must be processed. It should be noted that downsampling is permitted while still achieving accurate results throughout process 10. As a result, both the amount of memory and processor load which are necessary to perform the overall analysis are reduced while still achieving reliable results. Consequently, the overall system operates more efficiently and inexpensively. It should also be noted that although the preferred embodiment utilizes 512 samples downsampled to 128 samples, each of the parameters including sampling rate, period of sampling and ratio of downsampling may be adjusted or altered by one skilled in the art without departing from the scope of the intended invention.

Once the preferred number of samples are obtained, various computations and measurements are performed. In particular, a Root Mean Square ("RMS") value computational step 20 is performed on the 128 samples. As discussed in greater detail below, this RMS value, when squared, reflects the energy level of the samples. In particular, this energy level is used with respect to heuristic classification in order to specifically identify the type of signal being received. The number of zero crossings for the frame of samples is also measured in a zero crossing measure step 22. This zero crossing process is performed according to techniques known in the art. The actual number of zero crossings measured is also used in connection with heuristic classifications in order to determine whether or not the sampled telephone signal constitutes either a busy or a reorder signal.

A computation step 24 is performed to compute the Linear Prediction Coding ("LPC") coefficients of the downsampled data frame. The LPC coefficients are calculated as is known in the art in order to generate a linear model for the signal. The LPC model assumes that the current signal is the sum of previous signals plus a noise factor. In particular, the LPC analysis provides that a signal is a function of time and may be described in terms of the following:

$$y(t) = \Sigma a_k y(t-k) + n(t) \qquad \text{Eqn. (1)}$$

where, y(t) is the signal at a time t;
$a_k$ is a weighting factor;
y (t−k) is the signal at a previous time, t−k; and
n(t) is the variance of the noise at time t.

Under LPC analysis, the LPC coefficients may be used in order to calculate an estimated weighting factor to be used for $a_k$. In addition, a variance computation step 26 is performed utilizing the LPC coefficients so that the variance of noise, n(t), may be determined. In particular, the variance of noise is calculated according to:

$$v = l^T R l \qquad \text{Eqn. (2)}$$

where, v is the variance of noise;
l is the LPC coefficient vector of the input data;
$l^T$ is the transpose of l and
R is the covariance matrix of the input data.

For purposes of comparing the actual data to reference data, computation step 24 is also performed on one or more predetermined reference sets of data. In particular, in the preferred embodiment, three different reference sets of data are stored in the form of LPC coefficients. These three references preferably reflect LPC coefficients for three different types of ring signals which may be encountered on the telephone line. Three different rings are provided because, although the telephone system is governed and therefore should include only one type of ring signal, it has been determined that various types of ring signals may still appear on a telephone line. Accordingly, each of the three reference LPC coefficient sets represent respective types of possible ring signals.

In addition to the reference LPC coefficient sets, the variances of each of the three reference signals are also computed. This computation is performed in accordance with Equation (2) and step 26 above. As a result, following variance computation step 26, process 10 includes the variance, $v_d$, of the data as well as the variances $v_{r1}$, $v_{r2}$ and $v_{r3}$ for the three respective reference ring signals.

A comparison step 28 is performed in order to compare the data variance, $v_d$, with each of the respective reference variances. In the preferred embodiment, this comparison is performed in terms of a ratio and, therefore, is:

$$r = V_d/V_{rn} \qquad \text{Eqn. (3)}$$

where,
r is the ratio of the data variance to a reference variance; and
$V_{rn}$ is one of the n number of reference variances.

From a review of Equation (3), it may be appreciated that if the data is similar to one of the references, the ratio r will be approximately 1 for the comparison of the data to that reference. Thus, through Equation (3), it is determined if there is a large probability that the data approximates one of the three reference values. If there is such a large probability, then at this step within process 10 there is an indication that the particular data most likely corresponds to one of the three ring signals represented by the three references. As described in greater detail below, additional heuristic analysis are carried forwarded in order to either verify or refute this indication.

A delay block 30 causes process 10 to accumulate data and perform its analysis over a multiple frame time period. In the preferred embodiment, process 10 is repeated three times so that data is measured and evaluated, and calculations are made, for three consecutive frames of signal on the telephone line. As a result, the series of three frames may be subject to additional characterizations and classifications in order to more accurately predict the type of signal received on the telephone line. While delay block 30 is illustrated in a looping fashion, it should be understood that the collected frames of information are gathered on an ongoing basis and the processing time necessary for performing steps 16–28 does not interrupt the collection of data. Therefore, the three frames collected through delay block 30 represent consecutive signal information on the telephone line and are not separated by gaps of lost information due to the operation of process 10.

In order to more accurately predict the type of signal analyzed by process 10, a heuristic classification step 32 is performed on various characteristics of the telephone line signal. As used herein, the term heuristic is defined in its ordinary meaning, that being including a problem solving technique in which the most likely solution of several alternatives is found by applying different considerations. Thus, in the present invention, the following heuristic rules are applied to particular signal characteristics so that process 10 may generate an accurate prediction of the type of signal on the telephone line. In particular, the heuristic rules are as follows:

1. The duration of a ring signal is at least 0.9 seconds, but not longer than 2.5 seconds. Accordingly, process 10 may continue over multiple frames in order to analyze a time period between 0.9 and 2.5 seconds. Thus, if process 10 has reached a tentative conclusion that the signal is a ring signal, it further determines that that signal has a duration of 0.9 to 2.5 seconds in order to further confirm that evaluation.

2. The energy level (square of the RMS value) of a ring signal remains relatively constant throughout the duration of a ring signal. Accordingly, when process 10 has reached a tentative conclusion that the signal is a ring signal, it may further evaluate the RMS value (or its square) throughout the duration of the signal to determine whether or not that RMS value remains relatively constant. If the value is relatively constant, it may be concluded that the signal is a ring signal; however, if the RMS value fluctuates during the duration of the signal, it may be concluded that the signal is something other than a ring signal.

3. The energy level (square of the RMS value) of a human voice signal varies significantly over the duration of the signal. Thus, in comparison to the second heuristic rule discussed above, a fluctuating energy level indicates a probability that the signal is a human voice signal rather than a ring signal. Accordingly, an evaluation of the energy level of the signal is further determinative of whether or not the signal constitutes either a ring or human voice signal.

4. A click signal lasts at most 0.25 seconds. Thus, a signal previously characterized as a click signal by process 10 may be evaluated further to ensure that the characterization as a click signal remains consistent for a time period less than 0.25 seconds. If, however, process 10 has an initial indication that the signal is a click signal, but the duration of that signal extends beyond 0.25 seconds, process 10 may conclude that the signal is not a click signal.

5. The on/off interval of a busy signal is approximately 500 milliseconds and is approximately 250 milliseconds for a reorder signal. As stated above, zero crossing measuring step 22 determines the number of zero crossings for a sampled signal. In particular, for both a busy and reorder signal, a predetermined number of zero crossings may be expected when either the busy or reorder signal is on. Thus, by comparing this predetermined number with the number of measured zero crossings, an initial indication is made as to whether or not the analyzed signal is either a busy or reorder signal. Once this initial indication is made, the on/off interval or duration of the signal may also be monitored to confirm that the signal is either a busy or a reorder signal. During this duration, the on/off interval of a busy signal is approximately 500 milliseconds while the on/off interval of a reorder signal is approximately 250 milliseconds. Thus, the indication through analysis of zero crossing that a signal is either a busy signal or a reorder signal may be further confirmed by monitoring the duration of the signal to determine whether it is on and off for either 500 or 250 milliseconds.

Figure 3:
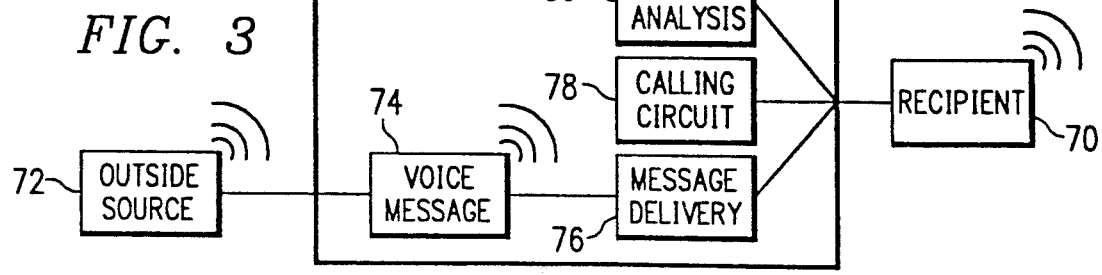
FIG. 3 illustrates a block diagram of a phone message delivery system in accordance with the present invention.

From the above it may be appreciated that process 10 performs various measurements and analysis in order to classify a telephone signal as either a ring, voice, click, busy or reorder signal. This classification process is preferably implemented in a system such as that illustrated in FIG. 3. Voice delivery system 34 receives messages from outside sources 72. These messages are stored as voice messages 74 in voice delivery system 34. In addition to the voice messages 74 the outside sources 72 provide indication of intended recipients for the voice messages. This information is used by the calling circuit 78 to the intended recipient 70 of a message. The signal received from the recipient 70 is analyzed by the signal analysis circuit 80 to determine whether the received signal is a busy, a reorder, or a click signal. If a voice signal is encountered, as discussed in detail below, then message delivery circuit 76 delivers the voice message 74 to the recipient 70. The details of the operation of system 34 is discussed in reference to FIG. 2. In particular, FIG. 2 illustrates a voice delivery system 34. Voice delivery system 34 operates in order to transfer a voice message to its intended recipient. In particular, system 34 retains the voice message until the intended recipient is contacted over the phone. Once contacted, the voice message is delivered to the recipient.

In detail, voice delivery system 34 begins at a start block 36. From start block 36, the process continues to a receive voice message step 38. At step 38, a voice message is received from an outside source. For example, the outside source may constitute a phone messaging system which receives voice messages along with an indication of the intended recipient for the voice message. Thus, an exemplary system would be one wherein a person may call the system and leave a message as well as enter a code corresponding to the intended recipient of the call. System 34 operates to retain this message and later deliver it in accordance with the steps detailed below.

Once a voice message is received, the intended recipient for the message is called during step 40. This call may be placed according to known principles in the art. Thus, for the example above, the code entered by the sender of the message is deciphered and the intended recipient of the voice message is called. Upon completing the dialing sequence, system 34 operates during step 42 to identify the type of signal which is received in response to placing the call. As mentioned above, system 34 is configured in order to anticipate receiving either a ring, voice, click, busy or reorder signal. Accordingly, the remaining steps of FIG. 2 are directed toward identifying which type of signal is received and acting accordingly.

System 34 analyzes the received signal in order to determine whether it is a busy or reorder or click signal during step 44. The particular process implemented in order to determine whether the signal is one of these three types of signals is that discussed above in connection with FIG. 1. If the received signal is either a busy, reorder or click signal, the system is configured in order to try to deliver the message again later as illustrated by step 46. Thus, upon encountering step 46, system 34 may wait a predetermined and desirable amount of time and later return to call intended recipient step 40. Upon recommencing the process at step 40, the remaining steps following thereafter may again be performed in an effort to attempt to deliver the voice message.

If the received signal is not determined to be a busy, reorder or click signal in step 44, system 34 continues and determines whether the received signal is a ring signal during step 48. If the received signal is a ring signal, system 34 continues to determine whether more than five consecutive rings have been received as illustrated by step 50. If less than five consecutive rings have been received, system 34 returns to step 42 to identify the immediately subsequent received signal. Thus, for example, if a series of three successive rings are received, system 34 will operate in a loop fashion as each successive ring is detected.

If more than five successive rings are encountered, system 34 will try again later to call the intended recipient as illustrated by step 52. As discussed in connection with step 46, the try again later indication of step 52 is an indication that system 34 will wait a predetermined amount of time and later, once again, return to step 40 in an effort to call the intended recipient of the voice message. From a review of steps 48, 50 and 52, it should be appreciated that system 34 will process successive rings until either more than five rings have been received or a signal other than a ring signal is encountered. For example, if three rings are received followed by a busy signal, process 34 will loop around three times between steps 42 and 50 and ultimately conclude at step 46 to try again later once the busy signal is detected during step 44. If the ring signal is followed by other signals such as a reorder, click or voice signal, then that alternative signal will be processed in general as discussed in connection with FIG. 2 as a whole.

If it is determined in step 48 that the receive signal is not a ring signal, system 34 determines whether the received signal represents silence of more than 20 seconds as illustrated in step 54. If the receive signal does constitute silence of more than 20 seconds, system 34 will again try again later to deliver the voice message as illustrated by step 56. If the received signal is not silence of more than 20 seconds, system 34 analyzes the signal to determine if it is a voice signal as shown in step 58. If the received signal is a voice signal, the voice message is delivered as illustrated in step 60. Alternatively, if the received signal is not a voice signal, system 34 continues to try again later to deliver the voice message as illustrated in step 62.

From a review of FIG. 2, it may be appreciated that system 34 operates to retain a voice message and attempt to deliver it to its intended recipient by calling that recipient and monitoring the signal received in response to placing the call. In particular, the system analyzes the signal in order to determine whether the signal is a busy, reorder, click, ring or voice signal, and additionally determines whether or not a signal of overlengthy silence is encountered. The system repeatedly attempts to deliver the message until a voice is encountered in response to placing the call. Upon receiving a voice signal, the system delivers the voice message to the recipient. Thus from the above, it should be appreciated that the present invention provides an accurate and reliable voice message delivery system. Further, while the present invention has been described in detail, it should be appreciated that various modifications, substitutions or alterations may be made thereto without departing from the spirit and scope of the invention as defined by the following claims.

What is claimed is:

1. A method of processing a received signal having characteristics and received from a telephone line to determine if a true voice signal, comprising:
   defining a frame by measuring a plurality of samples from said received signal over a predetermined period;
   determining the linear prediction coding coefficients of a selected group of the plurality of samples;
   determining the variance of the linear prediction coding coefficients;
   comparing the variance to a reference variance; and
   applying a heuristic rule based on a ring signal, a click signal, a reorder signal, or a busy signal on a telephone line to a selected characteristic of said received signal to determine if said received signal comprises a voice signal and not a ring signal, a click signal, a reorder signal or a busy signal.

2. The method of claim 1 wherein said applying a heuristic rule step includes a step of determining the root mean square of the plurality of samples over the predetermined period.

3. The method of claim 1 wherein said step of measuring over a predetermined period comprises measuring over a period of 64 milliseconds.

4. The method of claim 3 wherein said step of measuring a plurality of samples comprises measuring 512 samples over the period of 64 milliseconds.

5. The method of claim 1 wherein said step of measuring a plurality of samples comprises measuring 512 samples.

6. The method of claim 5 wherein said step of determining the linear prediction coding coefficients of a selected group from the plurality of samples comprises determining the linear prediction coding coefficients of every fourth sample of the plurality of samples.

7. The method of claim 5 wherein said step of determining the linear prediction coding coefficients of a selected group from the plurality of samples comprises determining the linear prediction coding coefficients of every sample of the plurality of samples.

8. The method of claim 1 wherein said step of determining the linear prediction coding coefficients of a selected group from the plurality of samples comprises determining the linear prediction coding coefficients of 128 of the 512 measured samples.

9. The method of claim 1 wherein said reference variance comprises a first reference variance, and further comprising the step of comparing the variance to a second reference variance.

10. The method of claim 1 wherein said reference variance comprises a first reference variance, and further comprising the steps of:
   comparing the variance to a second reference variance; and
   comparing the variance to a third reference variance.

11. The method of claim 10 wherein each of said comparisons of the variance with a reference variance comprises comparing the variance with a first, second or third reference representing a ring signal reference.

12. The method of claim 1 wherein said step of applying a heuristic rule to a selected characteristic of said received signal comprises evaluating a duration of multiple frames under the heuristic rule that the duration of a ring signal is at least 0.9 seconds but not longer than 2.5 seconds.

13. The method of claim 1 wherein said step of applying a heuristic rule to a selected characteristic of said received signal comprises evaluating a frame under the heuristic rule that the root mean square of a ring signal remains relatively constant during the period of the frame.

14. The method of claim 1 wherein said step of applying a heuristic rule to a selected characteristic of said received signal comprises evaluating a duration of multiple frames under the heuristic rule that the duration of a click signal is at most 0.25 seconds.

15. The method of claim 1 wherein said step of applying a heuristic rule to a selected characteristic of said received signal comprises evaluating a frame under the heuristic rule that the root mean square of a voice signal varies significantly over a period of the frame.

16. The method of claim 1 wherein said step of applying a heuristic rule to a selected characteristic comprises a step of measuring the zero crossing of said received signal during the predetermined period.

17. The method of claim 1 wherein said step of applying a heuristic rule to a selected characteristic of said received signal comprises evaluating a duration of multiple frames under the heuristic rule that the on/off interval of a busy signal is approximately 500 milliseconds.

18. The method of claim 1 wherein said step of applying a heuristic rule to a selected characteristic of said received signal comprises evaluating a duration of multiple frames under the heuristic rule that the on/off interval of a reorder signal is approximately 250 milliseconds.

19. A method of processing a received signal having characteristics and received from a telephone line to determine if a true voice signal, comprising:
   defining a frame by measuring a plurality of samples from said received signal over a predetermined period;
   determining the root means square of the plurality of samples over the predetermined period;
   determining the linear prediction coding coefficients of a selected group of the plurality of samples;
   determining the variance of the linear prediction coding coefficients;
   comparing the variance to a first reference variance;
   comparing the variance to a second reference variance;
   comparing the variance to a third reference variance; and
   applying a heuristic rule based on a ring signal, a reorder signal, a click signal or a busy signal to a selected characteristic of said received signal to determine if the signal is a voice signal and not a ring signal, a reorder signal, a click signal or a busy signal.

20. The method of claim 19 wherein said step of measuring a plurality of samples comprises measuring 512 samples over the period of 64 milliseconds.

21. The method of claim 19 wherein said step of determining the linear prediction coding coefficients of a selected group from the plurality of samples comprises determining the linear prediction coding coefficients of every fourth sample of the plurality of samples.

22. The method of claim 19 wherein each of said comparisons of the variance with a reference variance comprises comparing the variance with a first, second or third reference representing a ring signal reference.

23. The method of claim 19 wherein said step of applying a heuristic rule to a selected characteristic of said received signal comprises evaluating a duration of multiple frames under the heuristic rule that the duration of a ring signal is at least 0.9 seconds but not longer than 2.5 seconds.

24. The method of claim 19 wherein said step of applying a heuristic rule to a selected characteristic of said received signal comprises evaluating a frame under the heuristic rule that the root mean square of a ring signal remains relatively constant during a period of the frame.

25. The method of claim 19 wherein said step of applying a heuristic rule to a selected characteristic of said received signal comprises evaluating a duration of multiple frames under the heuristic rule that the duration of a click signal is at most 0.25 seconds.

26. The method of claim 19 wherein said step of applying a heuristic rule to a selected characteristic of said received signal comprises evaluating a frame under the heuristic rule that the root mean square of a voice signal varies significantly over a period of the frame.

27. The method of claim 19 wherein said step of applying a heuristic rule to a selected characteristic of said received signal comprises a step of measuring the zero crossing of said received signal during the predetermined period.

28. The method of claim 19 wherein said step of applying a heuristic rule to a selected characteristic of the signal comprises evaluating a duration of multiple frames under the heuristic rule that the on/off interval of a busy signal is approximately 500 milliseconds.

29. The method of claim 19 wherein said step of applying a heuristic rule to a selected characteristic of the signal comprises evaluating a duration of multiple frames under the heuristic rule that the on/off interval of a reorder signal is approximately 250 milliseconds.

30. A method of processing a received signal having characteristics and received from a telephone line to determine if a true voice signal, comprising:
   defining a frame by measuring a plurality of samples from said received signal over a predetermined period;
   determining the root mean square of the plurality of samples over the predetermined period;
   measuring the zero crossing of the signal during the predetermined period;
   determining the linear prediction coding coefficients of a selected group of the plurality of samples;
   determining the variance of the linear prediction coding coefficients;
   comparing the variance to a reference variance; and
   applying heuristic rules based on a ring signal, a reorder signal, a click signal or a busy signal to selected characteristics of said received signal to determine if said received signal comprises a voice signal and not a ring signal, a reorder signal, a click signal, or a busy signal.

31. The method of claim 30 wherein said reference variance comprises a first reference variance, and further comprising the steps of:
   comparing the variance to a second reference variance; and
   comparing the variance to a third reference variance.

32. The method of claim 30 wherein said step of applying heuristic rules to selected characteristics of said received signal comprises:
   evaluating a duration of multiple frames under the heuristic rule that the duration of a ring signal is at least 0.9 seconds but not longer than 2.5 seconds; and
   evaluating a frame under the heuristic rule that the root mean square of a ring signal remains relatively constant during the period of the frame.

33. The method of claim 30 wherein said step of applying heuristic rules to selected characteristics of said received signal comprises evaluating a duration of multiple frames under the heuristic rule that the duration of a click signal is at most 0.25 seconds.

34. The method of claim 30 wherein said step of applying heuristic rules to selected characteristics of said received signal comprises evaluating a frame under the heuristic rule that the root mean square of a voice signal varies significantly over the period of the frame.

35. The method of claim 30 wherein said step of applying heuristic rules to selected characteristics of said received signal comprises:
   evaluating a duration of multiple frames under the heuristic rule that the on/off interval of a busy signal is approximately 500 milliseconds; and
   evaluating a duration of multiple frames under the heuristic rule that the on/off interval of a reorder signal is approximately 250 milliseconds.

36. An automated method of transferring a voice telephone message to an intended recipient in a telephone message delivery system comprising the steps of:
   a) receiving a telephone voice message;
   b) storing the received message in a storage device;
   c) calling an intended recipient;
   d) processing a received signal from said recipient having characteristics and received from a telephone line to determine if a true voice signal, comprising the steps of:
   e) defining a frame by measuring a plurality of samples from said received signal over a predetermined period;
   f) determining the linear prediction coding coefficients of a selected group of the plurality of samples;
   g) determining the variance of the linear prediction coding coefficients;
   h) comparing the variance to a reference variance;
   i) applying a heuristic rule based on a ring signal, a reorder signal, a click signal or a busy signal on a telephone line to a selected characteristic of said received signal to determine if said received signal comprises a voice signal and not a ring signal, a reorder signal, a click signal or a busy signal; and
   j) delivering said message if said voice signal is determined.

37. The method of claim 36, wherein an storing step includes storing said indication of the recipient.

38. The method of claim 36, including the step of repeating the steps c through i to identify a voice signal when said received signal from said recipient is not a voice signal.

39. The method of claim 38, wherein said step of applying a heuristic rule to selected characteristics comprises evaluating a duration of multiple frames under the heuristic rule that the duration of a signal if at least 0.9 seconds but not longer than 2.5 seconds.

40. The method of claim 39, wherein said step of applying a heuristic rule to selected characteristics further comprises evaluating a frame under a heuristic rule that the root means square of a ring signal remains relatively constant during a period of the frame.

41. The method of claim 36, wherein said step of applying a heuristic rule to selected characteristics of said received signal comprises evaluating a duration of multiple frames under heuristic rule that the duration of a click signal is at most 0.25 seconds.

42. The method of claim 36, wherein said step of applying a heuristic rule to selected characteristics of said received signal comprises evaluating a frame under the heuristic rule that the root mean square of a voice signal varies significantly over a period of the frame.

43. The method of claim 36, wherein said step of applying a heuristic rule to selected characteristics of said received signal comprises;
   evaluating a duration of multiple frames under the heuristic rule that the on/off interval of a busy signal is approximately 500 milliseconds; and
   evaluating a duration of multiple frames under the heuristic rule that the on/off interval of a reorder signal is approximately 250 milliseconds.

* * * * *